(12) United States Patent
Ferris et al.

(10) Patent No.: US 9,390,749 B2
(45) Date of Patent: *Jul. 12, 2016

(54) POWER FAILURE MANAGEMENT IN DISK DRIVES

(71) Applicant: Western Digital Technologies, Inc., Irvine, CA (US)

(72) Inventors: Timothy A. Ferris, Mission Viejo, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,798

(22) Filed: Jul. 7, 2015

(65) Prior Publication Data

US 2015/0310886 A1    Oct. 29, 2015

Related U.S. Application Data

(63) Continuation of application No. 13/316,128, filed on Dec. 9, 2011, now Pat. No. 9,093,105.

(51) Int. Cl.
| | | |
|---|---|---|
| *G11B 19/04* | (2006.01) | |
| *G11B 19/20* | (2006.01) | |
| *H02P 3/14* | (2006.01) | |
| *H02P 25/02* | (2016.01) | |

(52) U.S. Cl.
CPC ............. *G11B 19/047* (2013.01); *G11B 19/20* (2013.01); *H02P 3/14* (2013.01); *H02P 25/028* (2013.01)

(58) Field of Classification Search
CPC ............. G11B 19/047; G11B 19/2072; G11B 19/044; G11B 19/20; G02P 25/028; H02P 3/14
USPC ........ 360/55, 73.01, 75, 272, 99.08; 365/226, 365/227, 228, 10
See application file for complete search history.

(56) References Cited

U.S. PATENT DOCUMENTS

| | | | |
|---|---|---|---|
| 4,375,663 | A | 3/1983 | Arcara et al. |
| 4,516,214 | A | 5/1985 | Ray |
| 5,047,988 | A | 9/1991 | Mizuta |
| 5,414,861 | A | 5/1995 | Horning |
| 5,438,549 | A | 8/1995 | Levy |

(Continued)

FOREIGN PATENT DOCUMENTS

WO    2010151347    12/2010

OTHER PUBLICATIONS

Notice of Allowance dated Mar. 30, 2015 from U.S. Appl. No. 13/316,128, 12 pages.

(Continued)

*Primary Examiner* — Thomas Alunkal

(57) ABSTRACT

A disk drive is disclosed comprising a disk, a spindle motor operable to rotate the disk, a head actuated over the disk, an interface operable to receive a host supply voltage, and a capacitor. The host supply voltage is used to charge the capacitor to a capacitor voltage higher than the host supply voltage. During a power failure, the host supply voltage stops charging the capacitor, and a motor supply voltage is generated from the spindle motor. The capacitor voltage is used to operate control circuitry, and when the capacitor voltage decays below the motor supply voltage, the motor supply voltage charges the capacitor.

18 Claims, 5 Drawing Sheets

(56) References Cited

U.S. PATENT DOCUMENTS

| | | | |
|---|---|---|---|
| 5,461,518 A * | 10/1995 | Saiki | G11B 17/225 360/69 |
| 5,495,372 A * | 2/1996 | Bahlmann | G11B 5/54 318/560 |
| 5,504,402 A * | 4/1996 | Menegoli | G11B 19/22 318/368 |
| 5,596,532 A | 1/1997 | Cernea et al. | |
| 5,693,570 A | 12/1997 | Cernea et al. | |
| 5,781,473 A | 7/1998 | Javanifard et al. | |
| 5,880,622 A | 3/1999 | Evertt et al. | |
| 5,889,629 A | 3/1999 | Patton, III | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A * | 7/2000 | Goretzki | G11B 5/5547 307/45 |
| 6,101,065 A | 8/2000 | Alfred et al. | |
| 6,104,153 A | 8/2000 | Codilian et al. | |
| 6,115,267 A | 9/2000 | Herbert | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,189,107 B1 | 2/2001 | Kim et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,305,628 B1 * | 10/2001 | Thompson | G11B 15/48 242/334.3 |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 * | 4/2003 | Bennett | G11B 19/22 360/73.03 |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,594,102 B1 | 7/2003 | Kanda et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,643,087 B1 * | 11/2003 | Kuroki | G11B 21/12 360/75 |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,856,556 B1 | 2/2005 | Hajeck |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,038,522 B2 | 5/2006 | Fauh et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |

(56) References Cited

U.S. PATENT DOCUMENTS

| | | |
|---|---|---|
| 7,113,365 B1 | 9/2006 | Ryan et al. |
| 7,116,505 B1 | 10/2006 | Kupferman |
| 7,126,781 B1 | 10/2006 | Bennett |
| 7,126,857 B2 | 10/2006 | Hajeck |
| 7,142,400 B1 | 11/2006 | Williams et al. |
| 7,158,329 B1 | 1/2007 | Ryan |
| 7,161,757 B1 * | 1/2007 | Krishnamoorthy .... G11B 19/20 360/69 |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,269,755 B2 | 9/2007 | Moshayedi et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,362,601 B2 | 4/2008 | Uematsu |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,409,590 B2 | 8/2008 | Moshayedi et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 * | 6/2009 | Desai ................. G11B 21/12 360/75 |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,623,316 B1 | 11/2009 | Rana et al. |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,733,712 B1 | 6/2010 | Walston et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 * | 9/2010 | Bennett ................ G11B 5/5526 360/75 |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |

(56) References Cited

U.S. PATENT DOCUMENTS

| | | | |
|---|---|---|---|
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2* | 1/2014 | Bennett | G11B 19/041 360/55 |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |
| 8,711,027 B1 | 4/2014 | Bennett | |
| 8,717,696 B1 | 5/2014 | Ryan et al. | |
| 8,717,699 B1 | 5/2014 | Ferris | |
| 8,717,704 B1 | 5/2014 | Yu et al. | |
| 8,724,245 B1 | 5/2014 | Smith et al. | |
| 8,724,253 B1 | 5/2014 | Liang et al. | |
| 8,724,422 B1 | 5/2014 | Agness et al. | |
| 8,724,524 B2 | 5/2014 | Urabe et al. | |
| 8,737,008 B1 | 5/2014 | Watanabe et al. | |
| 8,737,013 B2 | 5/2014 | Zhou et al. | |
| 8,743,495 B1 | 6/2014 | Chen et al. | |
| 8,743,503 B1 | 6/2014 | Tang et al. | |
| 8,743,504 B1 | 6/2014 | Bryant et al. | |
| 8,749,904 B1 | 6/2014 | Liang et al. | |
| 8,760,796 B1 | 6/2014 | Lou et al. | |
| 8,767,332 B1 | 7/2014 | Chahwan et al. | |
| 8,767,343 B1 | 7/2014 | Helmick et al. | |
| 8,767,354 B1 | 7/2014 | Ferris et al. | |
| 8,773,787 B1 | 7/2014 | Beker | |
| 8,779,574 B1 | 7/2014 | Agness et al. | |
| 8,780,473 B1 | 7/2014 | Zhao et al. | |
| 8,780,477 B1 | 7/2014 | Guo et al. | |
| 8,780,479 B1 | 7/2014 | Helmick et al. | |
| 8,780,489 B1 | 7/2014 | Gayaka et al. | |
| 8,792,202 B1 | 7/2014 | Wan et al. | |
| 8,797,664 B1 | 8/2014 | Guo et al. | |
| 8,804,267 B2 | 8/2014 | Huang et al. | |
| 8,824,081 B1 | 9/2014 | Guo et al. | |
| 8,824,262 B1 | 9/2014 | Liu et al. | |
| 9,093,105 B2* | 7/2015 | Ferris | G11B 19/047 |
| 2001/0024339 A1* | 9/2001 | Yaegashi | G11B 5/5521 360/75 |
| 2002/0141102 A1* | 10/2002 | Kusumoto | G11B 5/54 360/75 |
| 2004/0080858 A1* | 4/2004 | Suzuki | G11B 5/54 360/75 |
| 2006/0069870 A1* | 3/2006 | Nicholson | G06F 1/30 711/118 |
| 2007/0033433 A1* | 2/2007 | Pecone | G06F 1/305 714/6.13 |
| 2008/0111423 A1 | 5/2008 | Baker et al. | |
| 2009/0140575 A1 | 6/2009 | McGee et al. | |
| 2009/0206657 A1 | 8/2009 | Vuk et al. | |
| 2009/0206772 A1 | 8/2009 | Bayer et al. | |
| 2009/0254772 A1 | 10/2009 | Cagno et al. | |
| 2009/0289607 A1 | 11/2009 | Mentelos | |
| 2010/0035085 A1 | 2/2010 | Jung et al. | |
| 2010/0052625 A1* | 3/2010 | Cagno | G01R 31/028 320/166 |
| 2010/0066431 A1 | 3/2010 | Carter | |
| 2010/0072816 A1 | 3/2010 | Kenkare et al. | |
| 2010/0090663 A1 | 4/2010 | Pappas et al. | |
| 2010/0146333 A1 | 6/2010 | Yong et al. | |
| 2010/0202240 A1 | 8/2010 | Moshayedi et al. | |
| 2010/0302664 A1* | 12/2010 | Heo | G11B 27/36 360/31 |
| 2010/0329065 A1 | 12/2010 | Johnston et al. | |
| 2010/0332858 A1 | 12/2010 | Trantham et al. | |
| 2011/0066872 A1 | 3/2011 | Miller et al. | |
| 2011/0080768 A1 | 4/2011 | Li et al. | |
| 2011/0080782 A1 | 4/2011 | Li et al. | |
| 2011/0093650 A1 | 4/2011 | Kwon et al. | |
| 2011/0198931 A1 | 8/2011 | Ly | |
| 2012/0284493 A1 | 11/2012 | Lou et al. | |
| 2013/0120870 A1 | 5/2013 | Zhou et al. | |
| 2013/0148240 A1 | 6/2013 | Ferris et al. | |

OTHER PUBLICATIONS

Non-Final Office Action dated Dec. 17, 2014 from U.S. Appl. No. 13/316,128, 10 pages.
Final Office Action dated Oct. 1, 2014 from U.S. Appl. No. 13/316,128, 46 pages.
Interview Summary dated Jun. 18, 2014 from U.S. Appl. No. 13/316,128, 3 pages.
Interview Summary dated Feb. 24, 2014 from U.S. Appl. No. 13/316,128, 3 pages.
Final Office Action dated Nov. 29, 2013 from U.S. Appl. No. 13/316,128, 12 pages.
Interview Summary dated Aug. 9, 2013 from U.S. Appl. No. 13/316,128, 3 pages.
Non-Final Office Action dated Apr. 24, 2013 from U.S. Appl. No. 13/316,128, 15 pages.

* cited by examiner

POWER FAILURE MANAGEMENT IN DISK DRIVES

RELATED APPLICATION

This application is a continuation of U.S. patent application Ser. No. 13/316,128, entitled "DISK DRIVE CHARGING CAPACITOR USING MOTOR SUPPLY VOLTAGE DURING POWER FAILURE," filed Dec. 9, 2011, the disclosure of which is hereby incorporated by reference herein in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

When a power failure occurs, it may be desirable to complete pending write commands prior to safely shutting down the disk drive so that user data is not lost. This is of particular concern in disk drives that cache write data in a volatile semiconductor memory prior to writing the data to the disk or a non-volatile semiconductor memory. A conventional disk drive may charge a capacitor to a high voltage using the power supplied by the host, and then use the capacitor voltage to power circuitry in the disk drive to flush a write cache during a power failure. Using a high voltage capacitor to generate the backup power is more cost effective compared to using a lower voltage capacitor or bank of capacitors.

DETAILED DESCRIPTION OF EMBODIMENTS OF THE INVENTION

Figure 1:
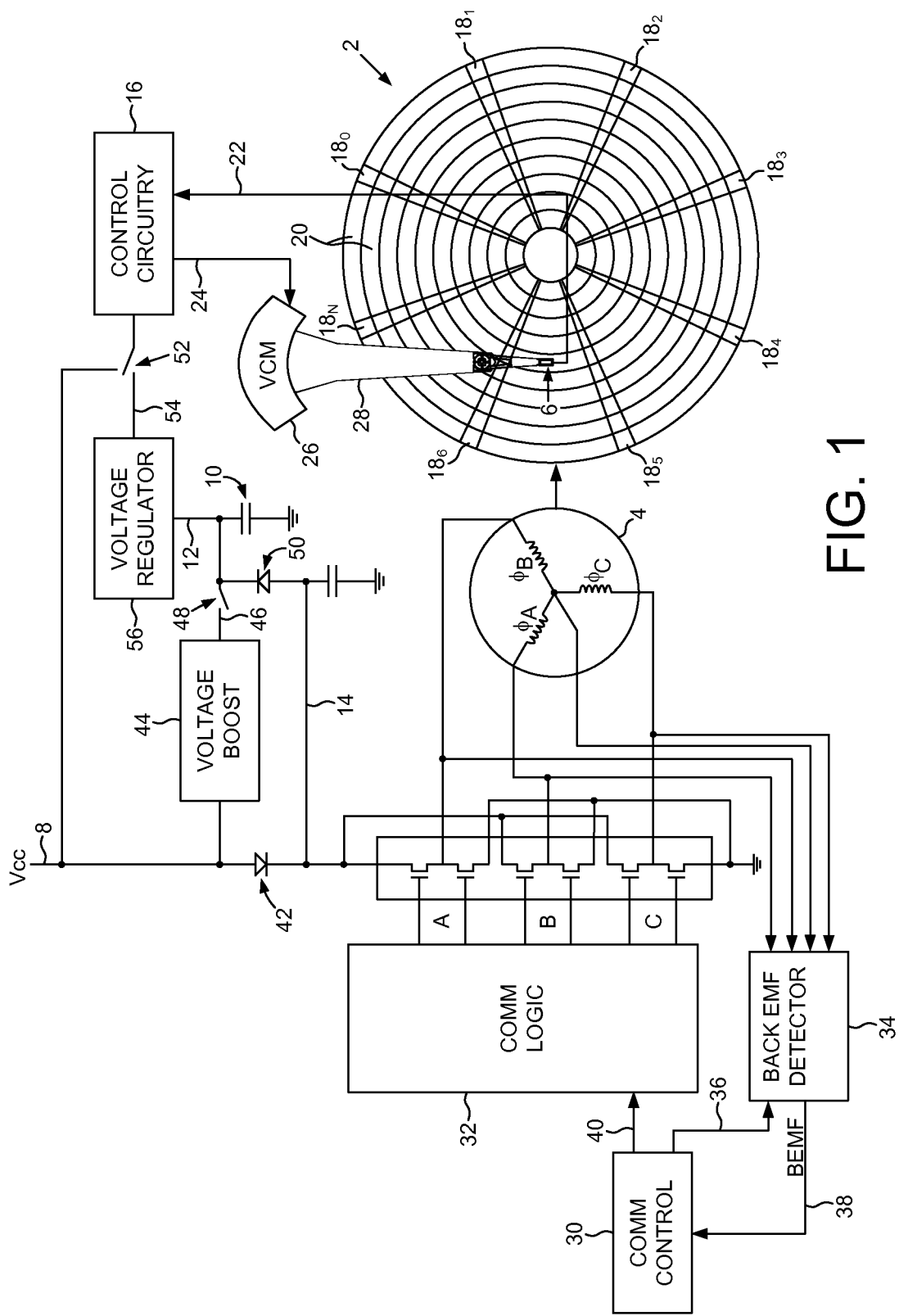
FIG. 1 shows a disk drive according to an embodiment of the present invention wherein a host supply voltage is boosted to charge a capacitor, and during a power failure, the capacitor is charged with a motor supply voltage when the capacitor voltage decays below the motor supply voltage.

FIG. 1 shows a disk drive according to an embodiment of the present invention comprising a disk 2, a spindle motor 4 operable to rotate the disk 2, a head 6 actuated over the disk 2, an interface operable to receive a host supply voltage 8, and a capacitor 10. The host supply voltage 8 is used to charge the capacitor 10 to a capacitor voltage 12 higher than the host supply voltage 8. During a power failure, the host supply voltage 8 stops charging the capacitor 10, and a motor supply voltage 14 is generated from the spindle motor 4. The capacitor voltage 12 is used to operate control circuitry 16, and when the capacitor voltage 12 decays below the motor supply voltage 14, the motor supply voltage 14 charges the capacitor 10.

In the embodiment of FIG. 1, the disk 2 comprises embedded servo sectors $18_0$-$18_N$ that define a plurality of servo tracks 20. The control circuitry 16 processes a read signal 22 emanating from the head 6 to demodulate the servo sectors $18_0$-$18_N$ and generate a position error signal (PES) representing an error between the actual position of the head and a target position relative to a target track. The control circuitry 16 filters the PES using a suitable compensation filter to generate a control signal 24 applied to a voice coil motor (VCM) 26 which rotates an actuator arm 28 about a pivot in order to actuate the head 6 radially over the disk 2 in a direction that reduces the PES. The servo sectors $18_0$-$18_N$ may comprise any suitable position information, such as a track address for coarse positioning and servo bursts for fine positioning.

The spindle motor 4 shown in FIG. 1 comprises a plurality of windings (e.g., φA, φB, φC) having a first end and a second end, wherein the second ends are connected together at a center tap. A commutation controller 30 commutates the windings over commutation intervals by controlling commutation logic 32. The spindle motor 4 is shown as comprising three windings (φA, φB, φC) corresponding to three phases. However, any suitable number of windings may be employed to implement any suitable multi-phase spindle motor. Further, any suitable commutation sequence may be employed to commutate the windings. For example, the commutation logic 32 may control switches to commutate the windings of the spindle motor 4 in a two-phase, three-phase, or hybrid two-phase/three-phase commutation sequence.

The windings of the spindle motor 4 are connected to a back electromotive force (EMF) detector 34 which detects threshold crossings (e.g., zero crossings) in a back EMF voltage generated by the windings with respect to the center tap. Since the back EMF voltage is distorted when current is flowing, the commutation controller 30 supplies a control signal 36 to the back EMF detector 34 identifying the "open" winding generating a valid back EMF signal. At each back EMF threshold crossing the back EMF detector 34 toggles a signal to generate a square wave signal 38. The frequency of the back EMF threshold crossings and thus the frequency of the square wave signal 38 represent the speed of the spindle motor 4. The commutation controller 30 evaluates the square wave signal 38 and adjusts a control signal 40 applied to the commutation logic 32 in order to control the speed of the spindle motor 4.

If a power failure occurs while the disk is spinning, there is residual kinetic energy as the disk continues to rotate the spindle motor 4, and therefore the spindle motor 4 can be converted into a generator for generating a motor supply voltage 14. A diode 42 disconnects the host supply voltage 8 from the windings of the spindle motor 4 and the motor supply voltage 14. The motor supply voltage 14 may be generated from the back EMF voltage in any suitable manner. In one embodiment, the back EMF voltage may be generated through a synchronous rectification technique wherein the back EMF voltage is rectified to generate the motor supply voltage 14. In another embodiment, a boost/brake technique may be employed which periodically shorts the windings in order to boost the back EMF voltage when generating the motor supply voltage 14. An example embodiment of a boost/brake technique is disclosed in U.S. Pat. No. 6,577,465 entitled "Disk drive comprising spin down circuitry having a programmable signal generator for enhancing power and braking control" the disclosure of which is herein incorporated by reference. In one embodiment, the motor supply voltage 14 may be generated using a combination of techniques, for example, by initially using synchronous rectification and then switching to boost/brake when the motor supply voltage falls below a threshold.

In the embodiment of FIG. 1, the host supply voltage 8 is boosted 44, and the boosted supply voltage 46 is used to charge the capacitor 10 during normal operation (i.e., switch 48 connects the capacitor 10 to the boosted supply voltage 46). During a power failure, switch 48 disconnects the capacitor 10 from the voltage booster 44 and switch 52 disconnects the control circuitry 16 from the host supply voltage 8 and connects the control circuitry 16 to a backup voltage 54 generated by a voltage regulator 56 using the capacitor voltage 12. The backup voltage 54 enables the control circuitry 16 to continue operating during the power failure, for example, to continue writing data to the disk 2 or to a non-volatile semiconductor memory in order to finish the current write operation. When the capacitor voltage 12 decays below the motor supply voltage 14, diode 50 begins conducting so that the motor supply voltage 14 begins charging the capacitor 10. In this manner, the voltage regulator 56 is able to supply the backup voltage 54 to the control circuitry 16 for a longer period to help ensure the disk drive shuts down safely during a power failure.

In one embodiment, the motor supply voltage 14 may be used to power a suitable VCM driver (e.g., an H-bridge driver) within the control circuitry 16 during a power failure, whereas the switching circuitry of the VCM driver may be controlled using the backup voltage 54 generated by the voltage regulator 56. Accordingly in this embodiment, the motor supply voltage 14 may be used immediately during a power failure in order to power the VCM driver, whereas the voltage regulator 56 for supplying the switching circuitry of the VCM driver begins using the motor supply voltage 14 after the capacitor voltage 12 decays below the motor supply voltage 14.

In the embodiment of FIG. 1, the disk drive receives a single host supply voltage 8 (e.g., a 5 v supply) for powering the spindle motor 4, VCM 26, and control circuitry 16 during normal operation, as well as for charging the capacitor 10 after boosting 44. In another embodiment shown in FIG. 2, the disk drive receives a first host supply voltage 8A (e.g., a 5 v supply) for powering the control circuitry 16 and charging the capacitor 10, and a second host supply voltage 8B (e.g., a 12 v supply) for powering the spindle motor 4 and VCM 26 during normal operation. During a power failure, a diode 57 disconnects the second host supply voltage 8B from the spindle motor 4 and the VCM 26.

Figure 3:
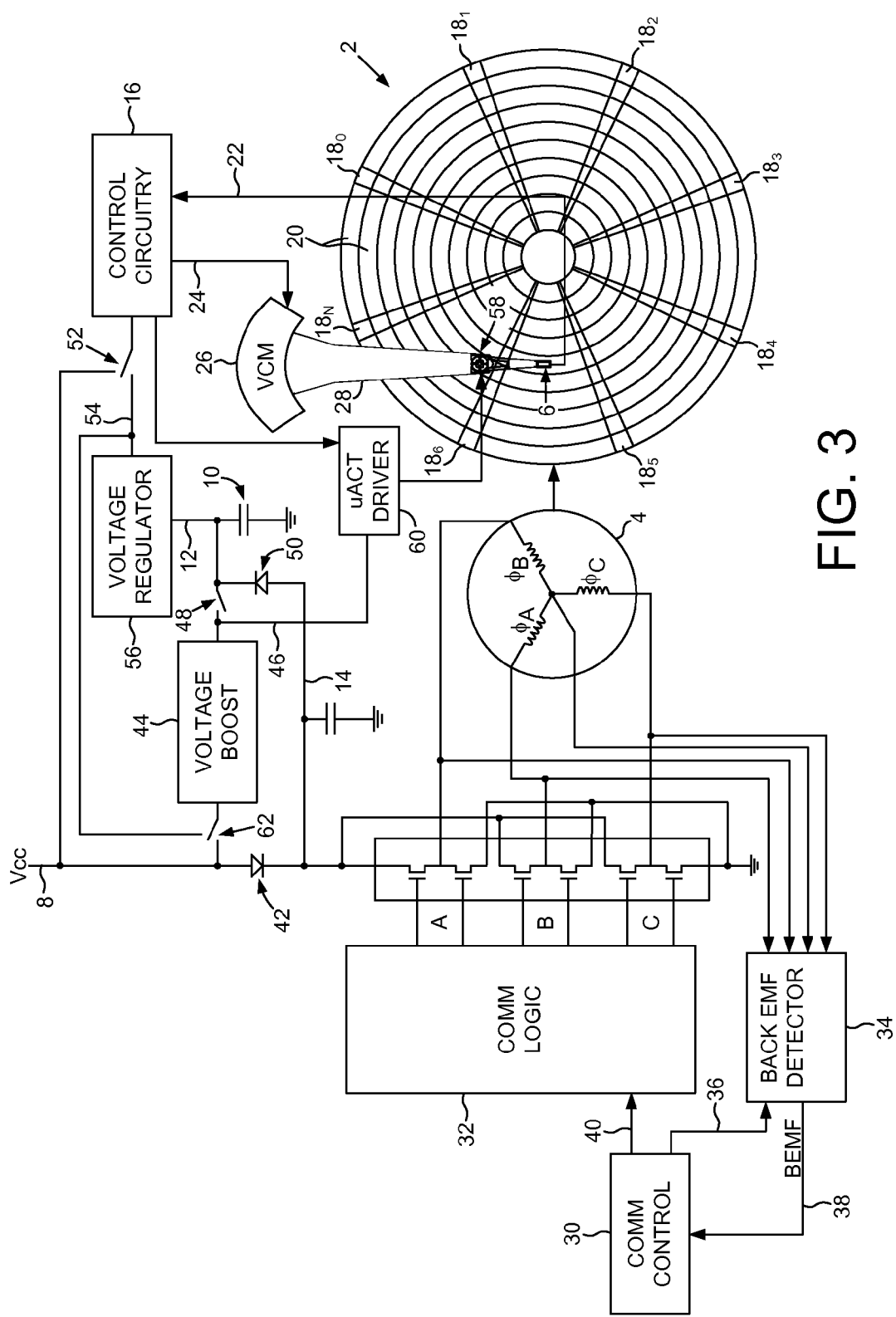
FIG. 3 shows a disk drive according to an embodiment of the present invention wherein a microactuator is controlled using the boosted voltage.

FIG. 3 shows a disk drive according to an embodiment of the present invention comprising a microactuator 58 for actuating the head 6 radially over the disk 2 in fine movements, whereas the VCM 26 actuates the head 6 radially over the disk 2 in coarse movements. Any suitable microactuator 58 may be employed, such as a suitable piezoelectric (PZT) actuator which deflects when modulated with a control voltage. The microactuator 58 may actuate the head 6 in any suitable manner, such as a microactuator 58 that actuates a suspension relative to the actuator arm 28 as shown on FIG. 3. In an alternative embodiment, the microactuator may actuate a head gimbal relative to the suspension. In the embodiment of FIG. 3, the boosted voltage 46 for charging the capacitor 10 is also used to power a microactuator driver 60. During a power failure, a switch 62 disconnects the input of the voltage booster 44 from the supply voltage 8 and connects the input to the backup voltage 54 generated by the voltage regulator 56. In this manner, the voltage booster 44 continues to generate the boosted voltage 46 for powering the microactuator driver 60 during the power failure.

Figure 4:
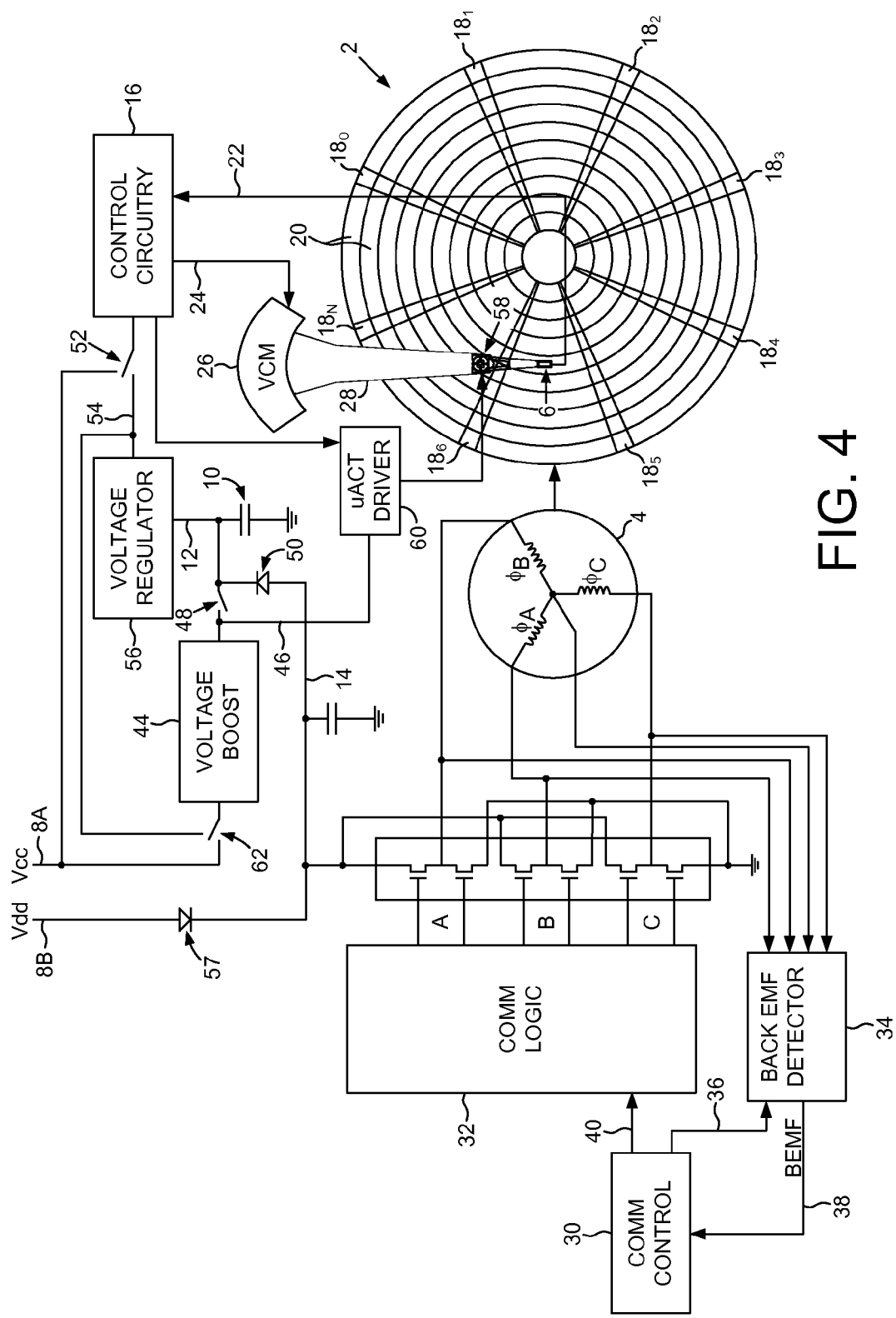
FIG. 4 shows a disk drive according to an embodiment of the present invention wherein a spindle motor is controlled using a second supply voltage.

FIG. 4 shows a disk drive according to an embodiment of the present invention that receives a first host supply voltage 8A (e.g., a 5 v supply) for powering the control circuitry 16 and charging the capacitor 10, and a second host supply voltage 8B (e.g., a 12 v supply) for powering the spindle motor 4 and the VCM 26 during normal operation. During a power failure, the diode 57 disconnects the second host supply voltage 8B from the spindle motor 4 and the VCM 26.

Figure 2:
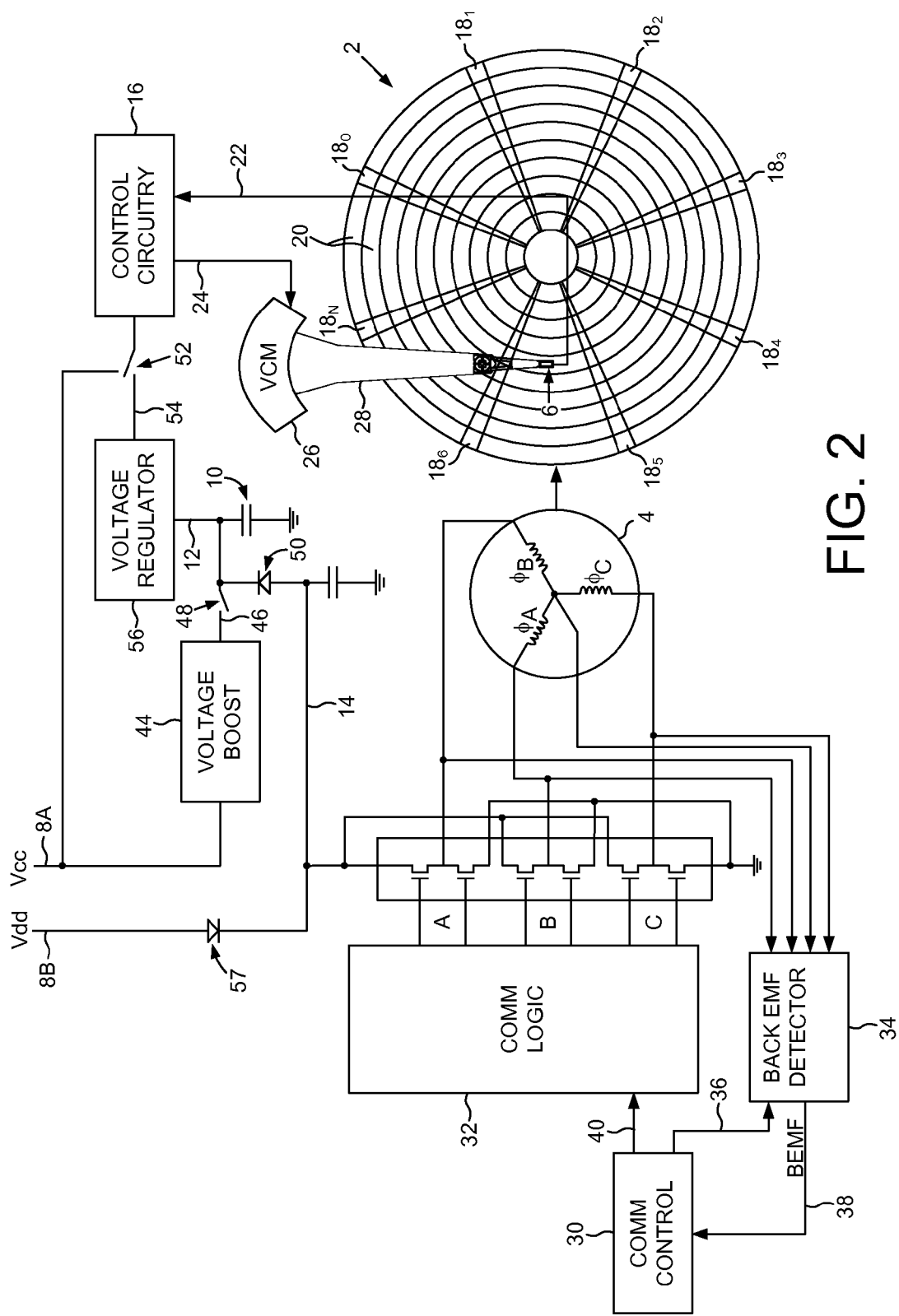
FIG. 2 shows a disk drive according to an embodiment of the present invention wherein a spindle motor is controlled using a second supply voltage.

In the embodiments of FIG. 2 and FIG. 4, designing the voltage booster 44 to boost the first host supply voltage 8A may provide a benefit over boosting the second host supply voltage 8B in that the voltage booster 44 may operate at the same input voltage during normal operation as well as during a power failure. That is, in one embodiment the backup voltage 54 generated by the voltage regulator 56 during a power failure may be substantially the same as the first host supply voltage 8A (e.g., 5 v supply). Otherwise the voltage booster 44 would need to boost the second host supply voltage 8B (e.g., 12 v supply) during normal operation, and then boost the backup voltage 54 during the power failure. Designing the voltage booster 44 to operate at a single input voltage may decrease the cost and complexity of the voltage booster 44.

Figure 5:
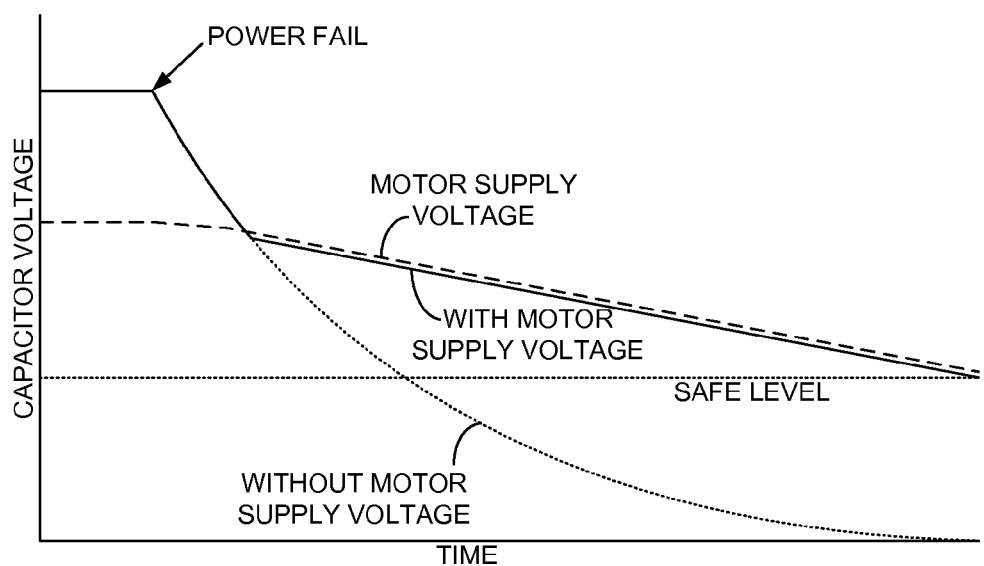
FIG. 5 is a graph of the capacitor voltage wherein the motor supply voltage maintains the capacitor voltage above a safe level for a longer period during a power failure according to an embodiment of the present invention.

FIG. 5 is a graph illustrating a benefit of charging the capacitor 10 using the motor supply voltage during a power failure. During normal operation, the capacitor voltage is charged to a high level (e.g., 17 v used to power a microactuator). When a power failure occurs, the voltage regulator 56 begins generating the backup voltage 54 using the capacitor voltage 12, thereby causing the capacitor voltage 12 to decay. When the capacitor voltage 12 decays below the motor supply voltage 14, the motor supply voltage 14 begins charging the capacitor 10 which extends the time the capacitor voltage 12 remains above a safe level (a level capable of reliably operating the disk drive). If the motor supply voltage 14 is not used to charge the capacitor 10, the capacitor voltage 12 may fall below the safe level before the disk drive finishes the operations needed to shut down safely.

Any suitable control circuitry may be employed to implement the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to implement the embodiments described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry for configuring the switches during a power failure as described in the above embodiments. In one embodiment, the operating voltage regulator(s) and the backup voltage regulator may be implemented within a power large scale integrated (PLSI) circuit coupled to an SOC, or integrated within an SOC.

What is claimed is:

1. A disk drive comprising:
a disk;
a head configured to write data to the disk;
a microactuator configured to actuate the head;
an interface operable to receive a host supply voltage;
a power storage device configured to store a backup voltage;
a voltage booster configured to receive the host supply voltage at a voltage booster input and generate a boosted host supply voltage; and
control circuitry configured to, in response to a power failure event:
    disconnect the voltage booster input from the host supply voltage and connect the voltage booster input to the backup voltage;
    generate a boosted backup voltage using the voltage booster; and
    power the microactuator using the boosted backup voltage.

2. The disk drive of claim 1, wherein the control circuitry is further configured to power the microactuator using the boosted host supply voltage during normal operation.

3. The disk drive of claim 1, wherein the microactuator is a piezoelectric microactuator.

4. The disk drive of claim 1, wherein the control circuitry is further configured to charge the power storage device using the boosted host supply voltage during normal operation.

5. The disk drive of claim 4, wherein the control circuitry is further configured to charge the power storage device to a voltage level greater than the host supply voltage.

6. The disk drive of claim 1, further comprising a first switch configured to selectively connect the voltage booster input to the host supply voltage or the backup voltage, wherein the control circuitry is further configured to disconnect the voltage booster input from the host supply voltage and connect the voltage booster input to the backup voltage at least in part by operating the first switch.

7. The disk drive of claim 6, further comprising a second switch configured to selectively connect the control circuitry to the host supply voltage or the backup voltage, wherein the control circuitry is further configured to, in response to the power failure event, disconnect the control circuitry from the host supply voltage and connect the control circuitry to the backup voltage by operating the second switch.

8. The disk drive of claim 1, further comprising a diode connected between a motor supply voltage and the power storage device.

9. The disk drive of claim 8, wherein the diode is configured to allow the motor supply voltage to charge the power storage device when the motor supply voltage is greater than a voltage level of the power storage device.

10. A device comprising:
control circuitry configured to:
    provide a host supply voltage received via an interface to a voltage booster over an input of the voltage booster;
    use the voltage booster to generate a boosted host supply voltage from the host supply voltage; and
    during a power failure:
        disconnect the voltage booster input from the host supply voltage and connect the voltage booster input to a power storage device storing a backup voltage;
        use the voltage booster to generate a boosted backup voltage; and
        power a microactuator using the boosted backup voltage, the microactuator being configured to actuate a head of a disk drive.

11. The device of claim 10, wherein the control circuitry is further configured to use the host supply voltage to charge the power storage device to a voltage level higher than the host supply voltage.

12. The device of claim 10, wherein the microactuator is a piezoelectric microactuator.

13. The device of claim 10, wherein the control circuitry is further configured to charge the power storage device using the boosted host supply voltage during normal operation of the disk drive.

14. The device of claim 10, wherein the control circuitry is further configured to disconnect the voltage booster input from the host supply voltage and connect the voltage booster input to the power storage device using a switch.

15. The device of claim 10, wherein the control circuitry is further configured to compare a motor supply voltage to a voltage level of the power storage device and allow the motor supply voltage to power the power storage device when the motor supply voltage is greater than the voltage level of the power storage device.

16. The device of claim 15, wherein the control circuitry is further configured to compare the motor supply voltage to the voltage level of the power storage device using a diode that is forward biased from the motor supply voltage to the power storage device.

17. The device of claim 10, wherein the control circuitry is further configured to receive the backup voltage from a voltage regulator.

18. The device of claim 10, wherein the control circuitry is further configured to use a motor supply voltage to power a voice coil motor (VCM) when a voltage level of the power storage device is greater than the motor supply voltage.

* * * * *